United States Patent [19]
Cruickshank

[11] Patent Number: 5,971,549
[45] Date of Patent: Oct. 26, 1999

[54] REMOTE CONTROLLED MIRROR SYSTEM FOR VEHICLES

[76] Inventor: Leslie Cruickshank, Box 780, Morrisburg, Ontario, Canada, K0C 1X0

[21] Appl. No.: 08/859,220

[22] Filed: May 20, 1997

[30] Foreign Application Priority Data

May 22, 1996 [CA] Canada ................................. 2177097

[51] Int. Cl.⁶ ............................. G02B 5/08; G02B 7/182
[52] U.S. Cl. ............................................ 359/843; 359/877
[58] Field of Search .................................. 359/843, 872, 359/877; 307/10.1

[56] References Cited

U.S. PATENT DOCUMENTS

| | | | |
|---|---|---|---|
| 4,609,265 | 9/1986 | McKee et al. | 359/843 |
| 4,938,577 | 7/1990 | Sugita | 359/843 |
| 4,971,430 | 11/1990 | Lynas | 359/843 |
| 5,035,496 | 7/1991 | An | 359/878 |
| 5,056,904 | 10/1991 | Okamura | 359/841 |
| 5,056,905 | 10/1991 | Jensen | 359/843 |
| 5,097,362 | 3/1992 | Lynas | 359/843 |
| 5,111,341 | 5/1992 | Keast | 359/841 |
| 5,132,851 | 7/1992 | Bomar et al. | 359/843 |
| 5,249,083 | 9/1993 | Doughtie | 359/843 |
| 5,719,713 | 2/1998 | Brown | 359/843 |
| 5,745,310 | 4/1998 | Mathieu | 359/843 |

FOREIGN PATENT DOCUMENTS

| | | |
|---|---|---|
| 2084895 | 12/1991 | Canada . |
| 2025841 | 3/1992 | Canada . |

*Primary Examiner*—Cassandra Spyrou
*Assistant Examiner*—Mark A. Robinson
*Attorney, Agent, or Firm*—Fish & Richardson P.C.

[57] ABSTRACT

A remote controlled mirror system for vehicles, particularly for trucks and articulated vehicles, providing a view to the rear of the vehicle over a large area by sweeping a rear view mirror. The mirror is urged into an adjustable normal rest position whenever it is moved from that position by actuating a control mechanism adjacent the vehicle driver. The position of the mirror is under control of the driver at all times, who actuates a convenient corresponding lever arm on a hand grip. The lever arm is lockable in multiple deflected positions under ratchet control of forced movement. The system provides for rapid return of the mirror to its normal rest position whenever the lever arm is released for return to its rest position.

33 Claims, 8 Drawing Sheets

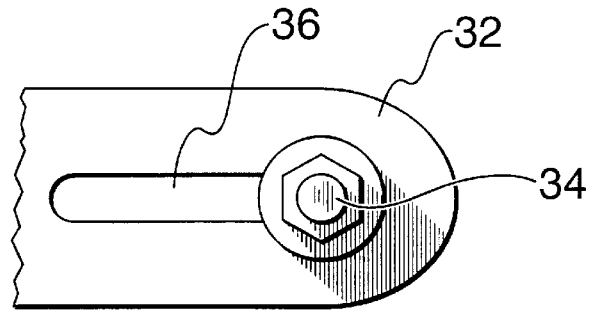
FIG. 5A1
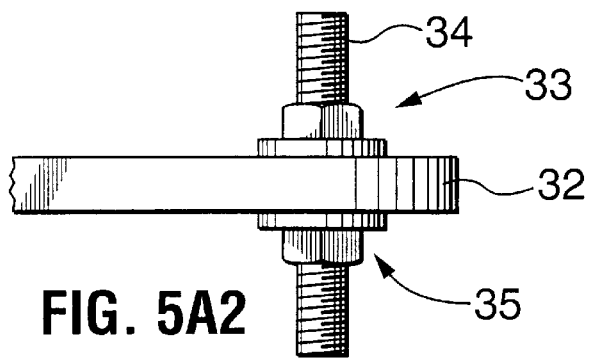
FIG. 5A2
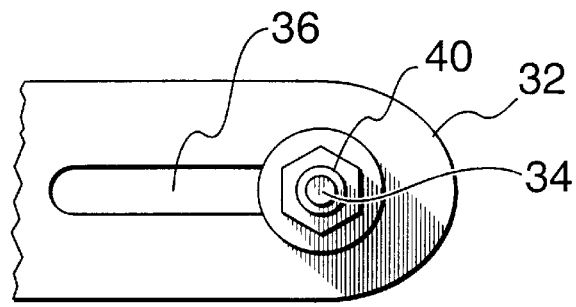
FIG. 5B1
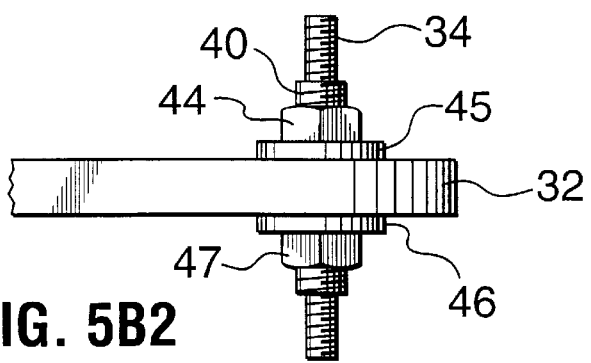
FIG. 5B2

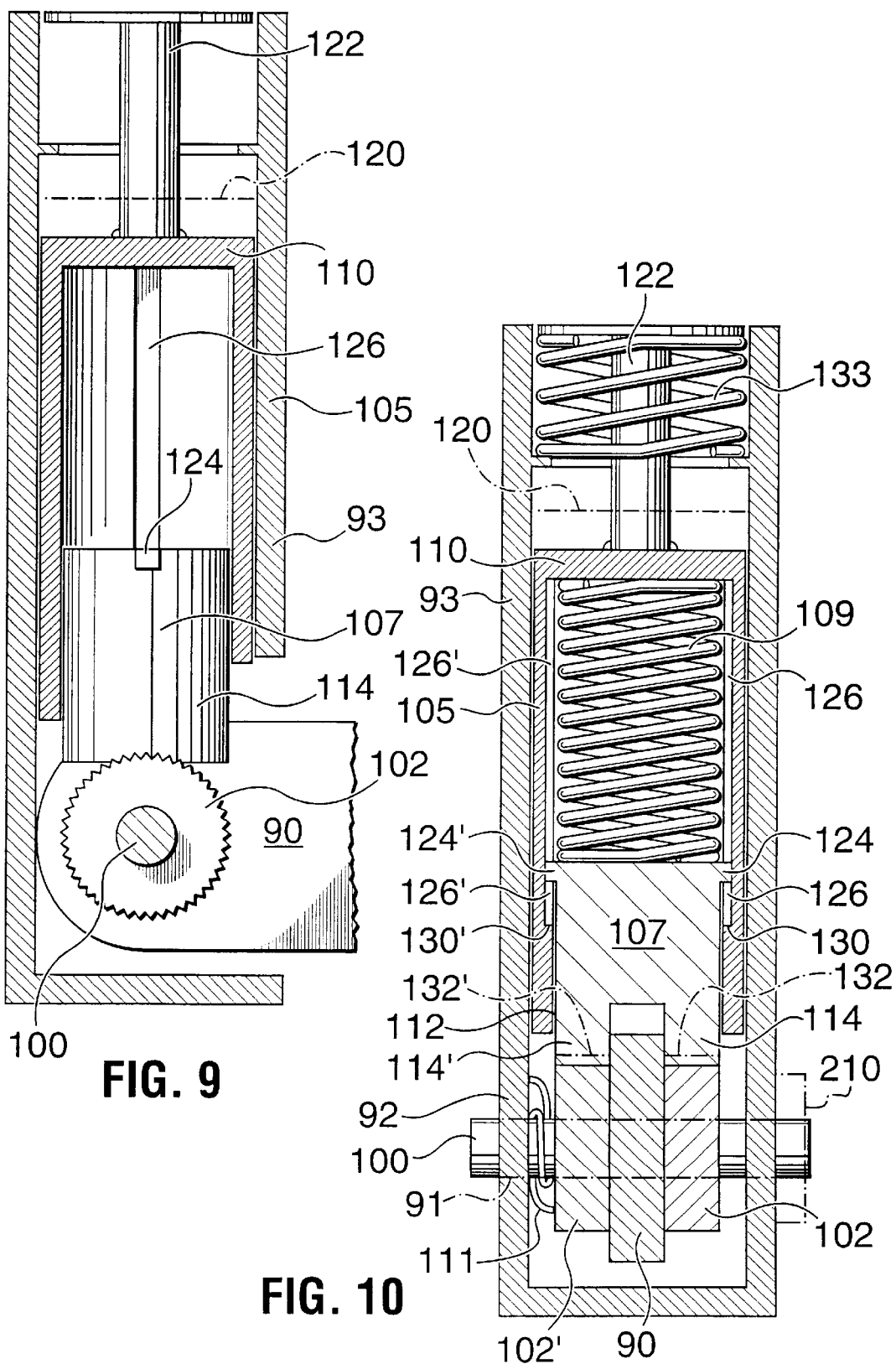

REMOTE CONTROLLED MIRROR SYSTEM FOR VEHICLES

This invention relates to a remote controlled mirror system for vehicles, particularly for trucks and articulated vehicles, where it is necessary to have a view to the rear of the vehicle over a wide angle field which cannot satisfactorily be achieved by use of a fixed mirror.

Instances where wider angle view is necessary occur whenever the vehicle is being manoeuvred in a parking or loading or unloading situation, when it is being driven in tight surroundings or in narrow thoroughfare conditions and when it is entering, changing or exiting lanes on a highway. Other instances occur and there is no attempt in this description to limit use of the device to those particular situations just described.

In the past, wide mirror viewing has been approached by making the mirror deflectable within its mounting. In one type of system the mirror is controlled by the angulation between vehicles having a cab and trailer for instance, U.S. Pat. No. 4,609,265, U.S. Pat. No. 5,056,905, or U.S. Pat. No. 5,249,083. In another, Canadian Patent 2,084,895, a timer mechanism determines the extent of mirror deflection.

Problems arise in all instances in acquiring adequate driver control of the position of the mirror and in resetting it to its "straight ahead" position after it has been deflected for wide angle viewing of the surroundings of the vehicle.

To overcome previous difficulties of accurate and smooth control of the positioning of the mirror by the driver when using the mirror to sweep or examine areas of the surrounding to the vehicle, and to allow the mirror to regain accurately its undeflected straight ahead position after use, the present invention provides, a mirror deflecting system comprising:

- a mirror;
- means mounting the mirror for movement on an axis so that an area greater than that of the field of view of the mirror when in a rest position can be observed in the mirror upon its said movement;
- a lever arm mounted for movement between a rest position and a deflected position;
- means for urging said arm into its rest position whenever moved from that position;
- operative means connecting said lever arm and said mirror for effecting movement of said mirror about said axis when said lever arm is deflected from said rest position; and
- means for setting the rest position of said mirror.

The invention allows not only trucks, but buses and vans, and any large vehicle to be improved for safety, ease of driving and maneuvering and the removing of blind spots, particularly the right side blind area in those vehicles having left hand drive (left side blind area for those having right hand drive).

Electrically rotated mirrors are now commonplace in vehicles, and the motorising allows for the sweeping of the mirror transversely and in azimuth. This standard arrangement is not satisfactory for the situations envisaged above. The motor movement is invariably too slow for most purposes and does not allow for automatic resetting of the mirror to the straight ahead position.

Embodiments of the present invention will now be described with reference to the accompanying drawings wherein.

Figure 1:
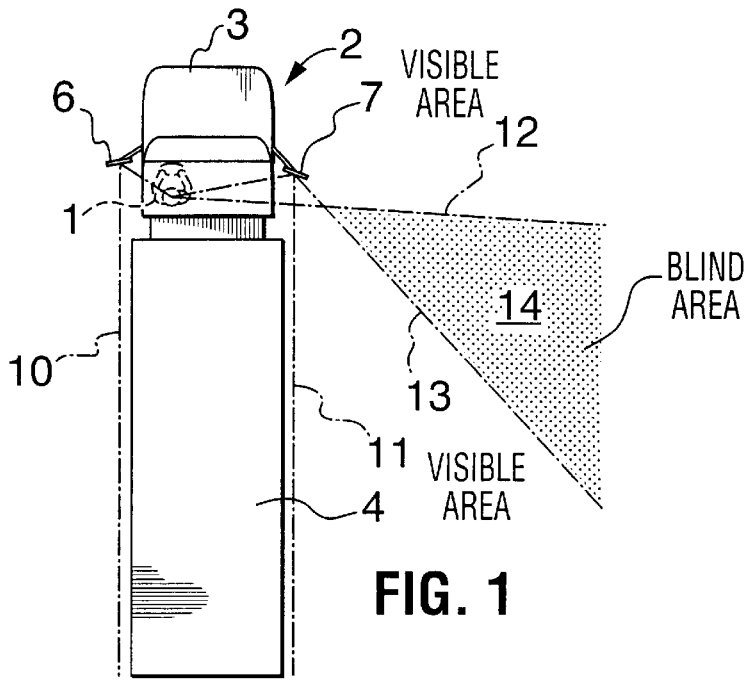
FIG. 1 shows a plan view in diagrammatic form of an articulated truck with the usual side mounted mirrors, and which shows the lines of sight for the driver and the blind area generated.
Figure 2:
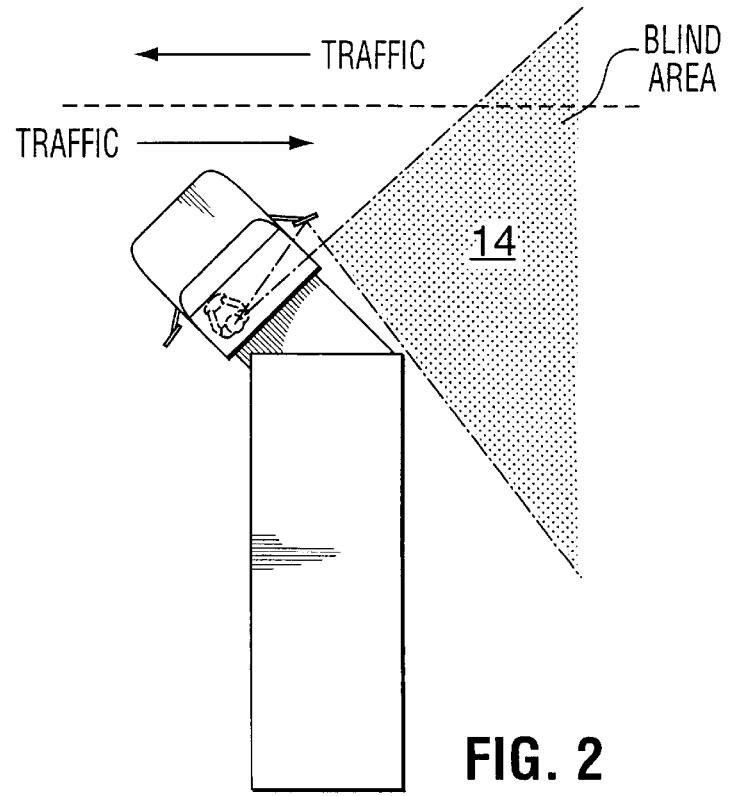
FIG. 2 is a plan view similar to FIG. 1, but with the vehicle making a left hand turn into a traffic pattern.
Figure 4:
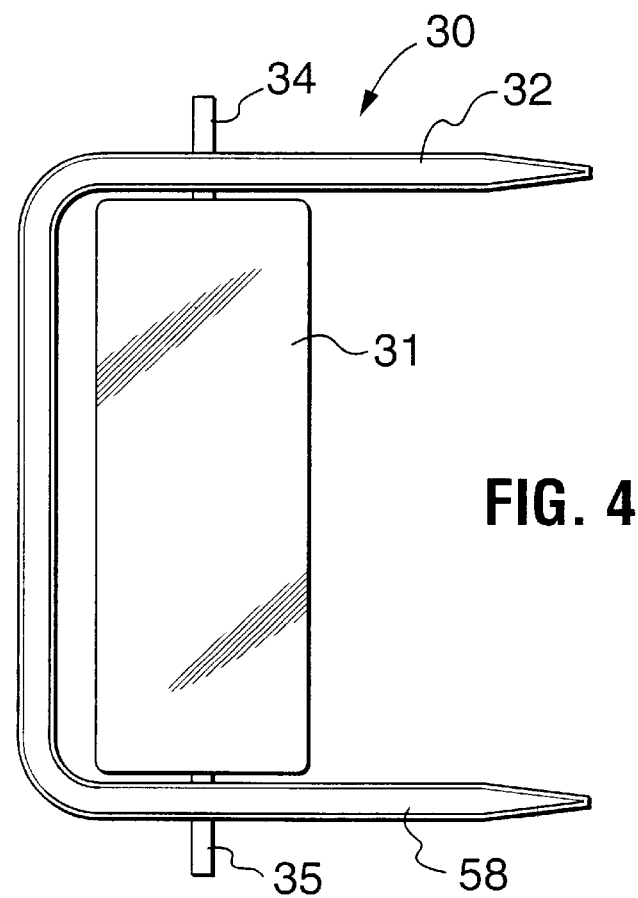
Figure 6:
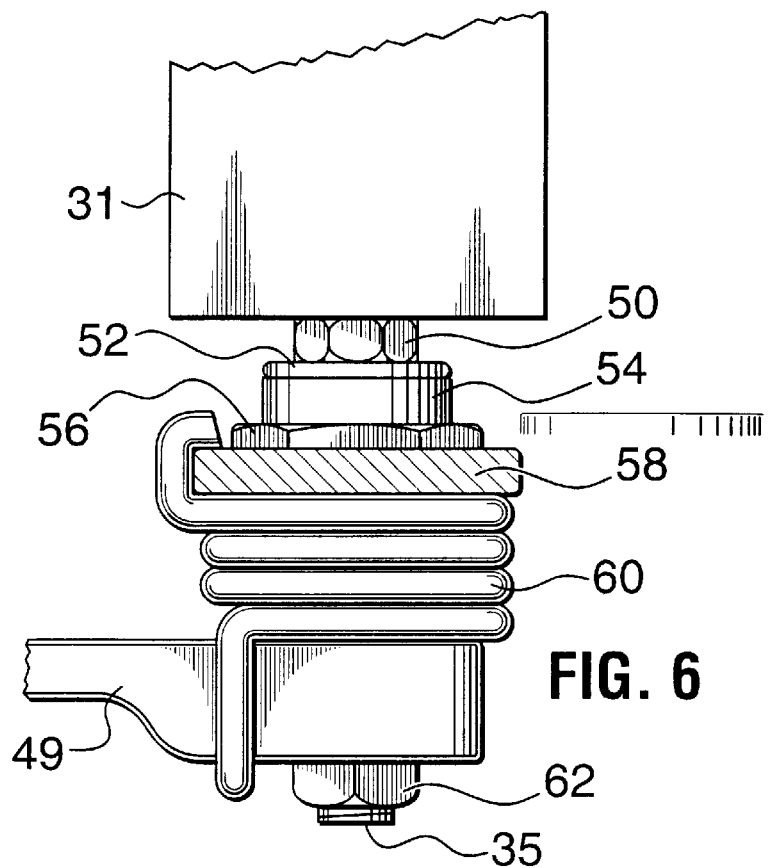
Figure 7:
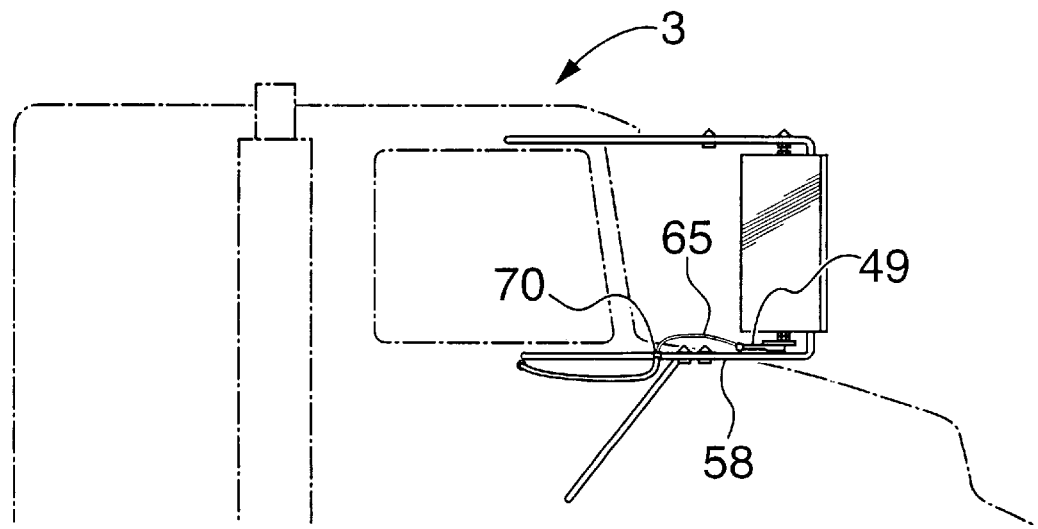
Figure 8:
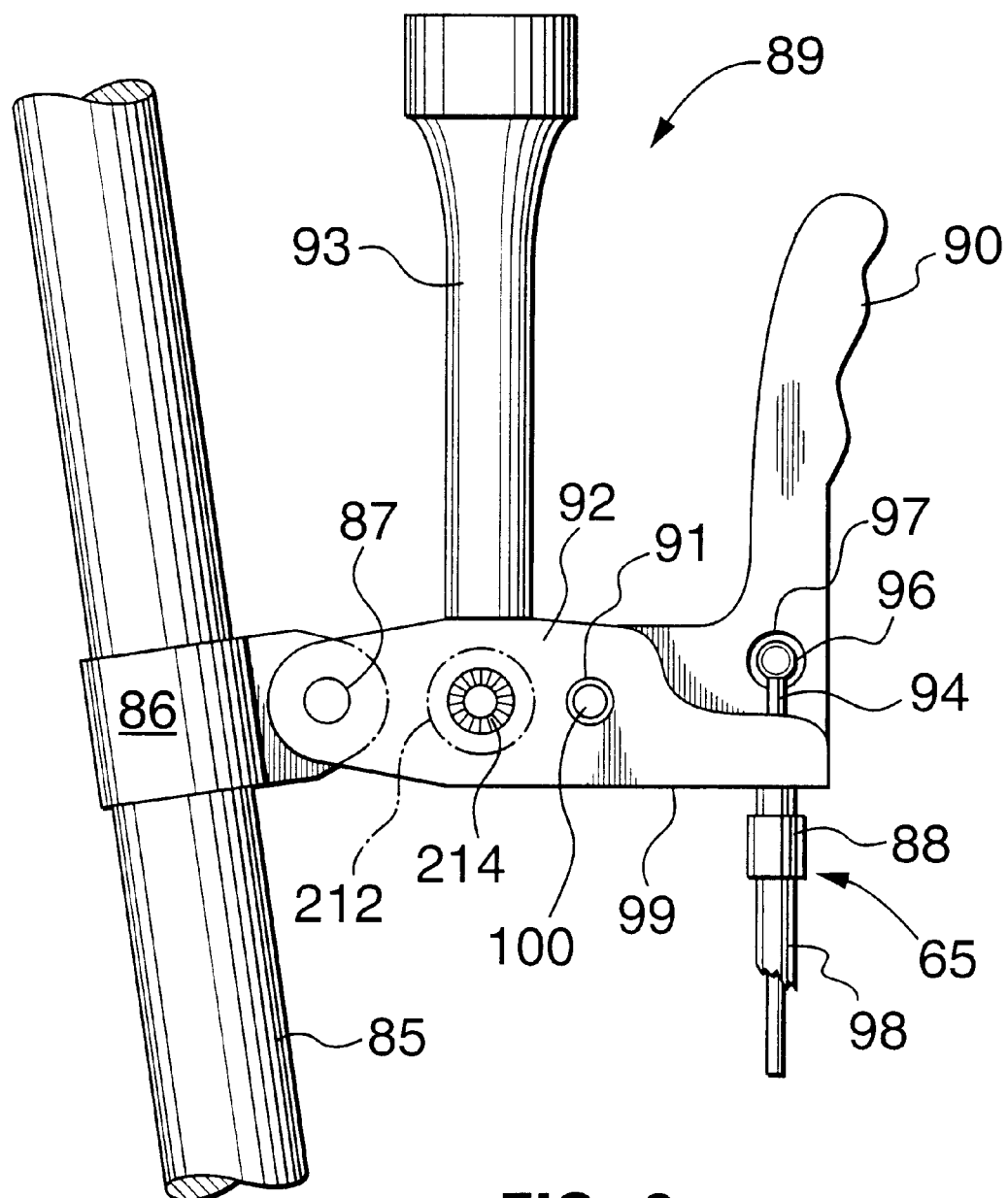
Figures 11A, 11B:
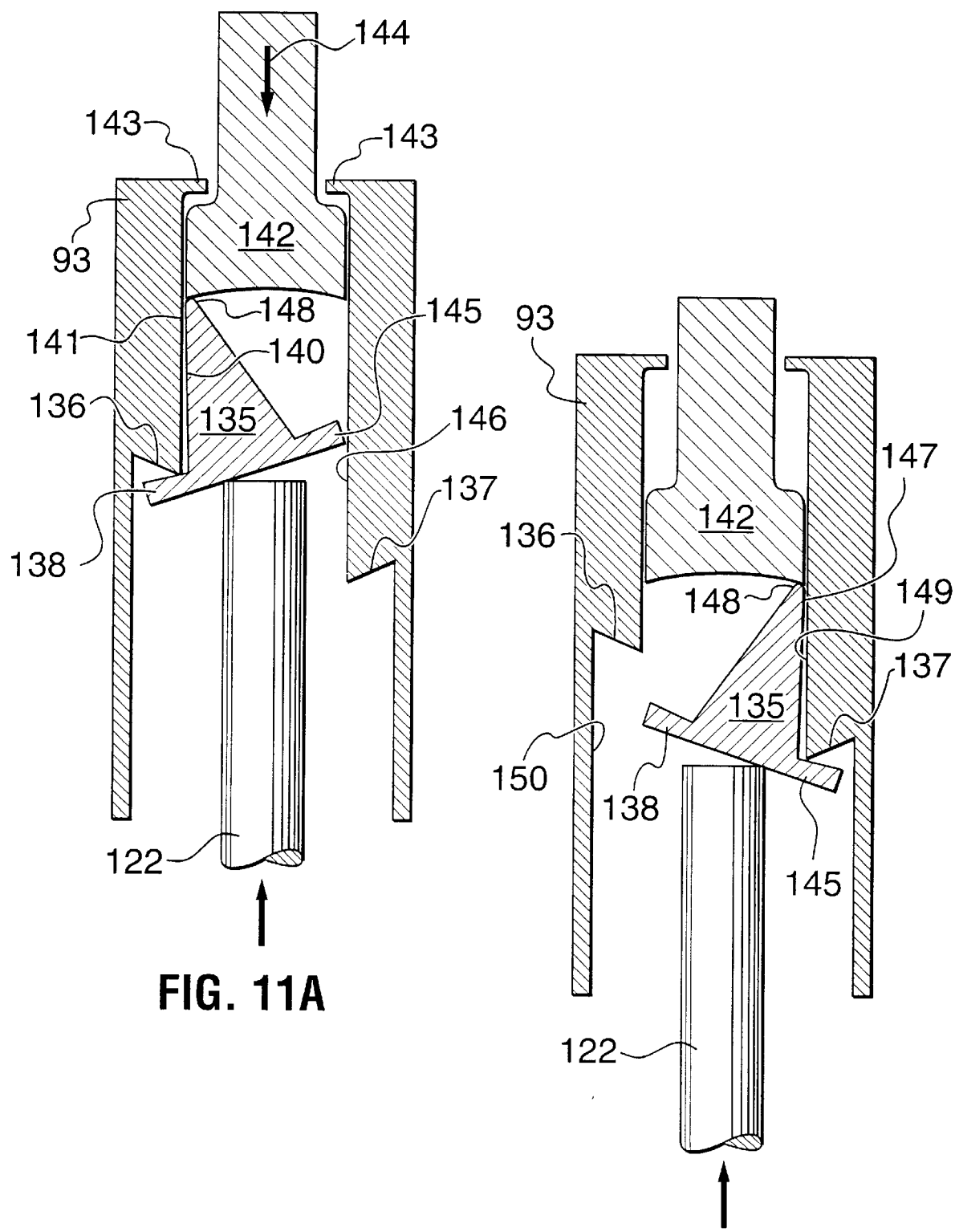
Figure 12:
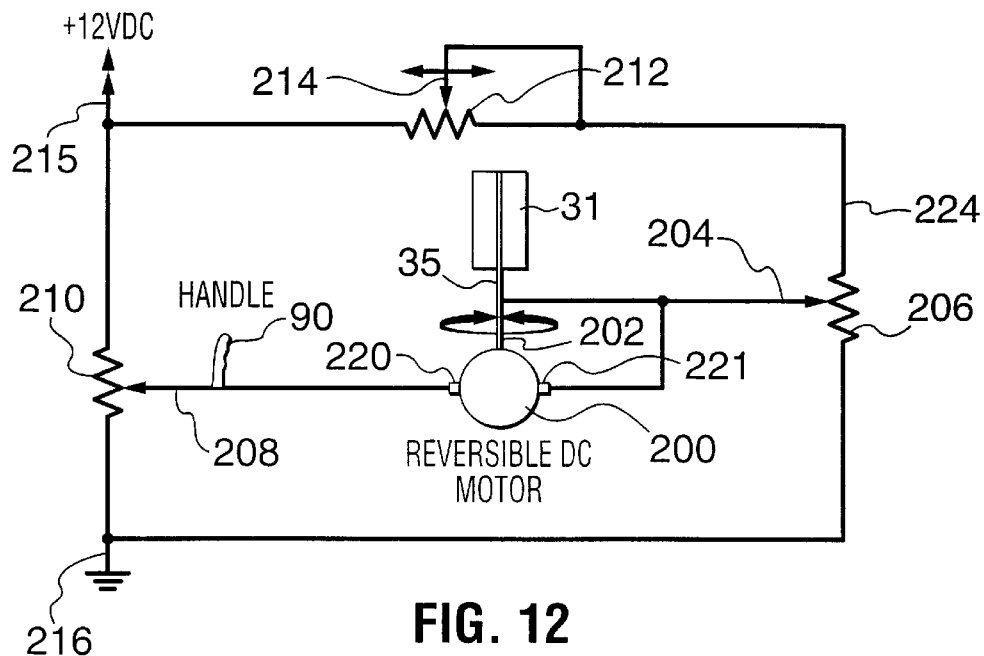
Figure 13:
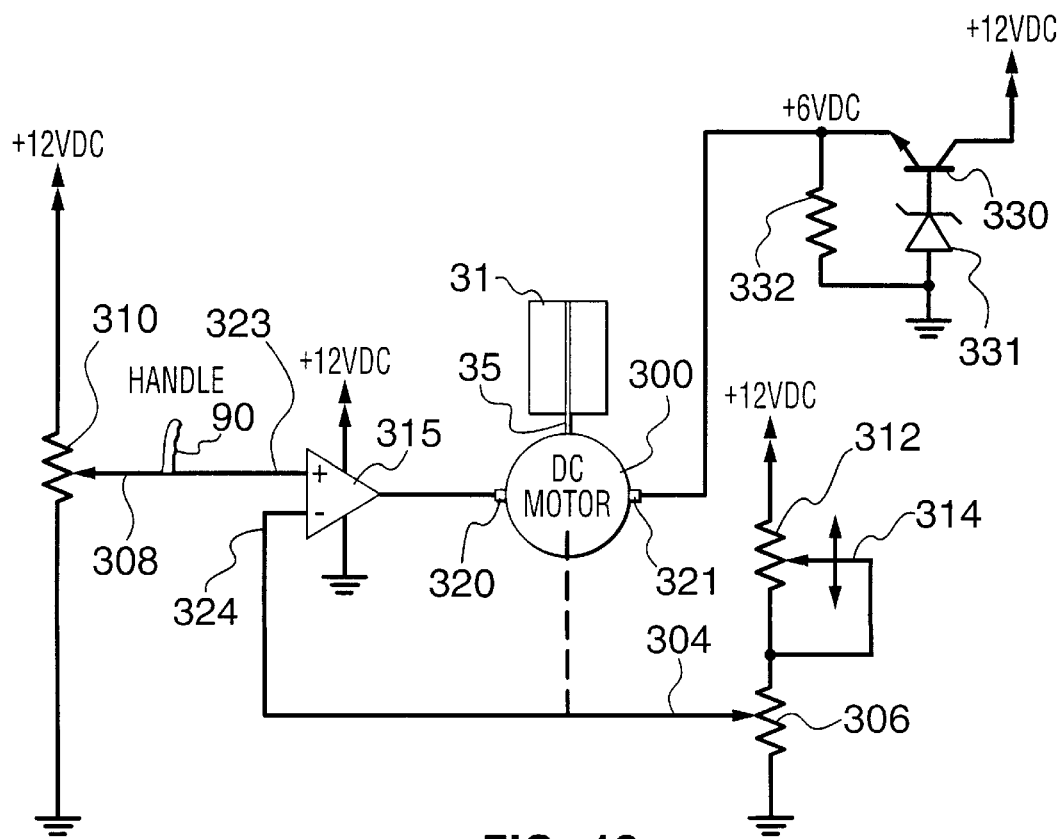

FIG. 4 diagrammatically shows a front elevation of a typical mirror mount for a truck;

FIGS. 5A1 and 5A2 show a side and plan view respectively of the upper mirror mount;

FIGS. 5B1 and 5B2 are the same views as FIGS. 5A1 and 5A2, but applicable to one embodiment of the invention;

FIG. 6 is a side view of the lower mount and swivel mechanism for a mirror structure embodying the invention;

FIG. 7 shows a side view of the mounted installed mirror of an embodiment of the invention;

FIG. 8 shows a side view of a typical hand grip arrangement by which the driver can control the positioning of the mirror at any time;

FIG. 9 is a side view, partly in section, of part of a modified hand grip arrangement with locking means;

FIG. 10 is a side view at right angles to that of FIG. 9;

FIG. 11A is a sectional view of a bistable push-push arrangement for latching the ratchet of FIGS. 9 and 10 in unlatched position;

FIG. 11B is the same arrangement of FIG. 11A in latched position;

FIG. 12 is a diagrammatic circuit diagram used in the second inventive embodiment of the mirror positioning system; and FIG. 13 is a circuit diagram of another inventive embodiment.

With reference first to FIG. 1, a driver 1 in an articulated vehicle assembly 2, having left hand drive, includes a cab 3 and trailer 4. The cab has the conventional outside cab mounted left rear view mirror 6 and right rear view mirror 7. As is typical in this and many similar large vehicles, the driver's direct view through the window at the back of the cab is blocked by the trailer so that all rear view is through these outside mirrors. The driver's direct angle of view is slightly greater than 180° since he can look over his left shoulder through the left door window, through the windshield, and through the right door window. The rear view mirrors supplement this. These mirrors have been developed over the years from a small mirror on one arm on one side which was subject to vibration, to currently, two large mirrors which can be six inches wide and sixteen inches high. One very popular system has the mirrors braced to the door or to the cab by at least five adjustable arms, and known in the industry as "West Coast" mirrors. They are mounted out far enough from the cab to allow the driver to look back along the side of the trailer box as indicated by the sight lines 10 on the left and 11 on the right as he moves his head forward or back or leans while in the seat.

Figure 3:
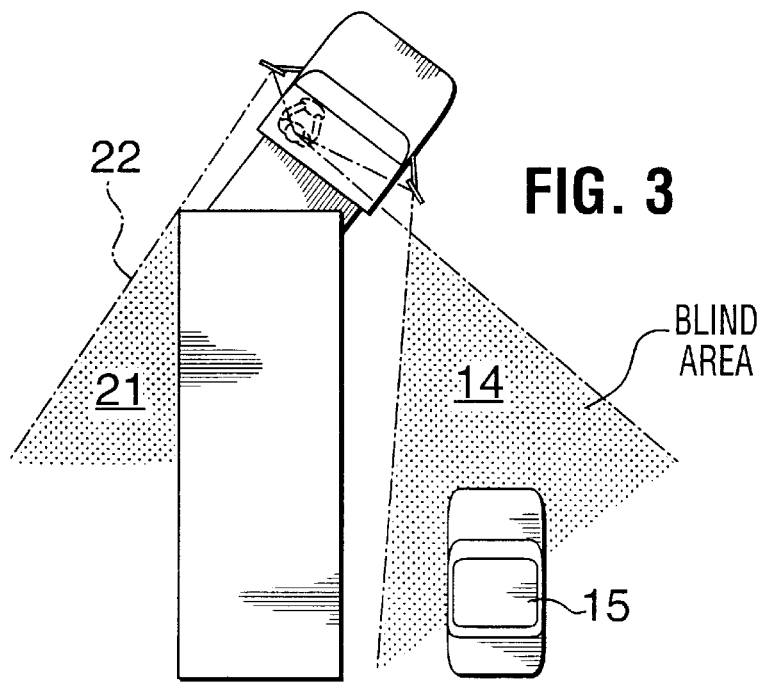
FIG. 3 is a view similar to FIGS. 1 and 2, but with the vehicle making a right hand turn from an outer lane in multi lane traffic.

On the right side there is a blind area between the driver's direct view and the area covered by the right mirror, embraced by sight lines 12 and 13. The mirror 7 can be convex to minimize the size of the blind area 14, but this reduces the size of the objects with the consequent reducing benefit to the driver. The problem created by the blind area 14 when entering traffic is exemplified in FIG. 2 when the combination of leaning forward and looking to the right increases the likelihood of surprises, particularly those coming out of the blind area which prevents the driver seeing oncoming traffic from the right. As shown in FIG. 3, a very similar problem can arise when turning across lanes in traffic where the blind area 14 blocks the driver's view of the upcoming vehicle 15 with obviously dangerous consequences. There is a blind area 21 on the left side behind the sight line 22 which develops when the vehicle is in the position of FIG. 3. Though this is not a problem in the particular situation depicted in FIG. 3, it becomes significant when parking or manoeuvring the vehicle at a busy loading dock with traffic moving around or past the dock.

As FIG. 4 depicts, a typical mirror 31 is attached to the upper arm 32 of a mounting bracket 30 by a threaded axle 34 whose end is received in slot 36 of arm 32 (see FIGS. 5A1 and 5A2) and tightened with a washer and nut assembly 33 and 35 on either side of the arm 32. This attaches the upper part of the mirror to the mount, secures it against vibration and allows it to be adjusted in the horizontal plane by rotating on the axle 34. The mirror is similarly mounted at its lower end by axle 35 in lower arm 58. If need be, it can also be moved vertically in the slot 36.

The inventor has discovered that if the mirror can be made horizontally rotating under the control of the driver, it is possible to sweep or pan the blind area concerned so that it can be eliminated, when and only when required, without losing normal viewing at other times.

To this end the mirror concerned can be made rotatable about its vertical mounting axis. As FIGS. 5B1 and 5B2 show, a modification to the upper point where the mirror is secured to the bracket 32 allows this by inserting a bushing 40 into the slot 36 of the bracket 32. The bushing is externally threaded and it can be secured in the slot 36 with nut 44 and 47. The mirror axle 34, is received in bushing 40, and is free to rotate within it.

With reference to FIG. 6, at the lower side of the mirror the mounting assembly is modified so that the lower mounting shaft 35 is free to turn but is spring loaded to rotate to a fixed or rest position whenever deflected out of this rest position by movement of a control arm 49. The lower shaft 35 of the mirror has nut 50, and fibre washer 52 placed upon it, which engages against the head of bushing 54 (similar to bushing 40) and which itself is threaded to nut 56 against the lower arm 58 (see FIG. 4) of the mounting bracket. Not seen in the view of FIG. 6 and beneath a return spring 60 is the lower part of the bushing 54 (similar to bushing 40 and carrying a nut similar to nut 42). The shaft 35 is flattened on the side of its lower end, so that a control arm 49 having a cooperating shoulder segment can be placed on the shaft and secured against rotation with respect to the shaft to allow the arm to twist the shaft about its axis. A nut 62 secures the arm 49 on the shaft and the return spring action between the bracket 58 and arm 49 urges the shaft to rotate in the direction of relaxation of the spring. In the arrangement shown the spring is such that it rotates the mirror in the anti-clockwise direction. An adjustable stop for the arm (not shown) can be provided for aligning for the "straight ahead" rest position for the mirror.

A positioning mechanism for the control arm 49 comprises a Bowden type cable 65, wherein the inner core can slide longitudinally with respect to the outer and which is illustrated in FIG. 7, the outer part of the cable being clamped to the bracket 58 at the point 70 and the inner core being fastened to the end of the control arm. This allows a straight pull or push on the end of the control arm with respect to the clamping point 70 when the inner flexible core of the cable is moved with respect to the outer. The extent of the movement of the inner core is directly related to the amount of turning to be effected in the mirror about its axis. As illustrated in FIG. 7, as the inner core moves into the outer jacket, so the mirror will rotate in the plane of the paper, that is in a clockwise direction with respect to a driver in the illustrated cab 3.

A suitable mechanism for moving the inner core of the cable with respect to the outer and which forms a control grip for the driver, is illustrated at 89 in FIG. 8. This is similar to a handlebar brake grip for a bicycle or motorcycle which includes a lever arm 90 pivoted at 91 in a frame portion 92. The frame 92 carries a stem 93 and the frame is also adjustably fastened by bolting through hole 87 to a clamp 86 attached for instance to gear shift lever 85 of the vehicle. The inner member 94 of the other end of the cable 65 (from that end shown in FIG. 7) is attached in conventional fashion such as by means of a crimped bead 96 on cable 94 received within a spherical recess 97 in the handle 90. By grasping this device 89 with the hand between stem 93 and arm 90 the operator is able to pull the core or inner section 94 with respect to the cable outer section 98 (received against the adjustment screw sleeve 88 threaded in flange arm 99 of frame 92). This linear movement of inner section 94 with respect to outer section 98 is transmitted along the cable to move the lever arm 49 as has been illustrated in FIG. 7. By locating the unit 89 on the gear shift lever the mirror can be manipulated at the same time as gear shifting if necessary. The rest position of the mirror can be adjusted from within the cab by turning the threaded sleeve 88.

Particular advantages of the inventive arrangement just described are that the portion of the mirror is under control of the driver at all times, its response to activating of the grip mechanism is instantaneous and is continuously variable between "straight ahead" and angle of deflection right up to fill deflection. Its return to the rest position is immediate when the driver relinquishes his grip, and the rest position is adjustable right at the site of the control mechanism to suit the particular operator. Although the lower arm 49 and spring 60 have been described as being at the lower mirror mount in the bracket 30, it will be clear to those skilled in the art that the upper and lower mounting assemblies could be reversed in any instance thought desirable so that the lever arm 49 is on the upper shaft 34 of the mirror. The spring 60 may be on the upper mounting assembly with the lever arm on the lower assembly by modifications which will also be clear to the skilled person. In all these cases, the mirror would be urged by the spring in the direction towards its rest position when not activated by the driver through control grip 89.

While mounting of the control grip 89 on the gear shift is preferred for convenience of operation, other suitable positions could be below the dash, on the front of the dash, on top of the dash, on a hand brake lever, etc.

If it is considered desirable that the mirror should be able to be maintained in any particular deflected position when the driver is not holding the lever 90, a mechanism such as that illustrated in FIGS. 9 and 10 can be employed. In FIG. 10, the lever arm 90 is shown pivoted on an axle 100 carried in hole 91 in frame 92. A serrated or toothed wheel 102 and a second serrated wheel 102', identical to wheel 102, are fixed to the lever 90 and surround the axle 100, and are free to rotate on the axle 100 with the lever arm 90. Received within the stem 93 is a spring and plunger housing 105 containing a plunger 107 urged by spring 109 in the direction from the closed end 110 of the housing to its open end 112. The plunger 107 is a sliding fit in the housing and includes two downwardly depending legs 114 and 114' which are also serrated on their lower ends to match and embrace the serrations of the wheels 102 and 102' respectively over a portion of their circumferences. The housing 105 can be moved between the solid position shown in FIGS. 9 and 10 and a raised position shown in broken lines at 120 under the action of a longitudinally movable rod 122 which is secured to the closed end face 110 of the housing 105.

The plunger 107 carries two outwardly extending ears 124 and 124' which run in longitudinal slots 126 and 126' in the housing 105. In FIGS. 9 and 10 the rod 122 is shown in its down position and the spring 109 urges plunger 107 into engaged contact with the wheels 102 and 102'. When rod 122 is subsequently moved to its upper position so that the housing 105 occupies the state indicated by broken lines 120 the raising of the housing will cause the plunger 107 to have its ears 124 and 124' in contact with the lowermost end walls 130 and 130' of the slots 126 and 126'. This lifts the plunger clear of the wheels 102 and 102' so that its legs 114 and 114' occupy the position shown by broken lines 132 and 132'. In this position lever 90 is free to rotate about its axle 100 whereas in the down position of the rod it is restrained against rotation by engagement of plunger 107 with wheels 102 and 102'. This arrangement has the advantage that, even when in the holding or down position of rod 122, the plunger 107 is spring loaded and lever 90 can be forced by the operator, when necessary, with a clicking or ratchet action. A spring 111 surrounds axle 100 and acts in the sense to urge and return wheel 102' and thus arm 90 to its rest position.

The number of positions in which the lever arm 90 can be held is to some extent a matter of choice. However, typically 10 locked positions over its full range would be satisfactory. The number of teeth on the serrated wheels and on the engaging legs of the plunger would be determined accordingly.

The flip-flop or two-position movement for rod 122 can be effected in a number of ways using a bi-stable mechanism such as that which is commonly employed for extending pens or writing instruments where one push extends the instrument and the second push releases it. Other mechanisms could include a spring loaded detent ball which engages rod 122 to hold it in its down position and to lock it there until the ball is released. In some instances, a single push push action button would be more convenient, in others a first button for moving the rod into the down position coupled with a second for locking and unlocking the detent would be preferred. A spring 133 urges the rod 122 into its upper position when not held by the detent.

One bi-stable push-push mechanism is illustrated in FIGS. 11A and 11B. The rod 122 rests against the base of a flanged triangular detent 135 contained within a tube such as the hollow stem 93 discussed earlier and which has offset ridges 136 and 137. In the position of FIG. 11A, the rod 122 is in its uppermost position with flange 138 engaging against offset 136 and with the side 140 of its head resting against the wall 141 of stem 93. Rod 122 is urged upwards by means of spring 133 described earlier and not shown in FIG. 11A. The press-press release button 142 is prevented from being pulled out of stem 93 such as by complementary ears 143 formed on the stem 93 and on the button 142. If the button 142 is now pressed in the direction of the arrow 144 the detent 135 will move downwards along with the rod 122 against the pressure of the spring 133 with head part 140 riding against the wall 141 and flange 145 sliding against wall 146. When flange 145 falls below offset 137 an unstable condition is created by virtue of couple produced by the line of action of the force on the tip of the head 148 and that on the base of the detent 135 from the rod 122. The result is that the detent moves sideways to the right as shown in FIG. 11A so that the flange 145 becomes accommodated beneath offset 137. When the pressure of button 142 on head 148 is released slightly, the detent 135 immediately clicks into the position shown in FIG. 11B (by virtue of the couple due to the force on it at offset 145 and rod 122) with the side 147 of the head of the detent against the wall 149. This is the stable down condition of the detent with rod 122 in the position in which it is shown in FIGS. 9 and 10.

If now pressure is once again exerted downwards on the head 148 of the cone from the button 142 as shown in FIG. 11B, the opposite unstable condition from that considered with respect to FIG. 11A occurs. The detent 135 rocks so that flange 145 moves away from offset 137 until flange 138 rests against the wall 150. Release of pressure on the button 142 allows the detent 135 to rise up in the stem 93 until flange 138 contacts against the underside of offset 136. Further release of the pressure on 142 allows the top of the detent then to rock across under the couple exerted by the force from the offset 136 and that from the rod 122 until the detent 135 takes the position of FIG. 11A once again. This is the up or released position of the rod 122 and of plunger 107.

FIG. 12 is a circuit diagram depicting an embodiment of the invention in which the mirror is under the control of a reversible DC motor 200.

The mounting mechanism for the mirror 31 is similar to that earlier described but with the motor and associated reduction gearing unit being mounted at the lower end of the mirror with its output shaft attached to shaft 35 which is free to move in a bushing assembly similar to that described in FIGS. 5B1 and 5B2 for upper shaft 34. As an alternative the motor and reduction gearing unit can be placed in a housing within which the mirror is enclosed for rotation about a vertical axis. The housing can be permanently secured to the bracket 32. In this instance the motor and gearing assembly may be accommodated behind the mirror within the housing, and the housing is then shaped accordingly such as by giving it a smooth bulge area for smooth streamlined air flow over it.

As seen in the circuit diagram of FIG. 12, the motor gearing output shaft 202 drives both the mirror shaft 35 and also the slider 204 of a potentiometer 206, preferably contained within the motor or its driven gear housing. Handle 90 of the operator's grip assembly, instead of its connection to cable 98 in FIG. 8 is now arranged to rotate the slider 208 of a potentiometer 210 mounted, for instance, on stem 93 in the position shown in broken lines at 210 in FIG. 10. The shaft 100 in this instance can be fixed to the arm 90 so that it rotates within the frame 92 and can then be used as the drive for the slider arm of the potentiometer 210. A further potentiometer 212 with slider 214 (shown in FIG. 12), can be mounted on the frame 92 in the broken-line position shown at 212 in FIG. 8. A knob 214' connected to the slider 214 is thereby accessible to the driver to allow the slider to be moved.

The function of the circuit of FIG. 12 is as follows:

The 12V DC supply from the vehicle battery system is applied between terminals 215 and 216. In the instance shown, 216 is the negative rail and connected to the vehicle ground. Reversible DC motor 200 is chosen to operate on as low a voltage as possible between its two input terminals 220 and 221. Assume that in the position shown there in no voltage across the motor terminals, that is that the potentials on sliders 204 and 208 are identical with respect to ground. If now the handle 90 is moved in the direction which raises the potential on the slider 208, current will flow from slider 208 through terminals 220 and 221 of the motor and out through slider 204. This current flow causes the motor to rotate, moving shaft 35 or mirror 31 and also moving slider 204 in a direction to increase the potential on that slider. The motor will come to rest when no potential difference again exists between sliders 208 and 204. Further movement of handle 90 in the same direction causes further movement of the motor, and movement of handle 90 in the opposite direction reverses the motor and hence the movement of the mirror. A zero or rest position setting for the mirror is when the handle 90 is in the relaxed position (say with slider 208 close to the lower end of potentiometer 210). This rest position can be adjusted using the variable resistance constituted by the potentiometer 212 and slider 214. Increasing the resistance decreases the positive voltage on terminal 224 of potentiometer 206, thus causing the motor to move slider 204 in a direction to compensate for the voltage change occasioned by the increase in resistance. Similarly, decreasing the resistance of potentiometer 212 raises the potential on slider 204 and causes the motor to move in the direction to reduce this potential.

A more sensitive version of this electromechanical drive is available using the circuit of FIG. 13. In this circuit the sliders 304, 308 and 314 correspond to sliders 204, 208 and 214 of potentiometer 306, 310 and 312 which in turn correspond to respective potentiometers 206, 210 and 212 of FIG. 12. An operational amplifier 315 has its direct input 323 connected to slider 308. Its output feeds the motor 300 at terminal 320. The terminal 321 of the motor is connected to a stabilized potential equal or close to that found on slider 308 when it is at the mid point of its travel on potentiometer 310. The stabilized potential is provided by the source/sink circuit of transistor 330, zener diode 331 and resistor 332, or functional equivalent Slider 304 of the motor position potentiometer 306 is connected to the inverting input of the OP AMP 315. Potentiometer 306 receives its input through the variable resistance comprising potentiometer 312 and slider 214.

Let us assume initially that in the position shown the voltage on slider 308 is identical to that on slider 304, and that the mirror is in some position between its rest position and its fully deflected position. If the handle 90 is now moved in a direction to increase the mirror deflection and increase the potential on slider 308 there will be an increase in potential at the input 323 of amplifier 315, which is translated to a current output available to input terminal 320 of motor 300. This causes the motor to turn in the direction to increase the mirror deflection. This movement also moves slider 309 in the direction to increase the potential on it and which appears at inverting input 324 tending to reduce the output of the amplifier 315. This is a very sensitive feedback loop which ensures that very minor changes of voltage on input 323 will lead to corresponding minor movements of motor 300 so that it faithfully follows even small changes in position of handle 90. Zero positioning of the mirror when the handle is in the released position (and the sliders 308 and 304 are near the bottom of their travel on their respective potentiometers) can be advanced by varying the position of slider 314 which transmits additional or lesser voltage to the upper terminal of potentiometer 306. The motor moves in the direction to compensate for this voltage change.

The exact gain of the amplifier is not critical although it should be sufficient that the motor follows all movements of the handle 90 perceptible by the driver. The particular voltages given are not critical so long as those available across the motor terminals can achieve positive and negative current flow of sufficient magnitude to turn the motor effectively.

Because the arm 90 is biased by spring 111 to its rest position, the mirror will always be returned to its straight-ahead orientation immediately the operator releases the hand grip and at the maximum rate of rotation of the motor. Individual zeroing is provided on the hand grip for adjustment to suit the driver concerned.

Other means for generating the potential to be supplied by the positioning of the arm 90 to the amplifier 315 will suggest itself to those skilled in the art, such as a piezo electric source receiving pressure in accordance with the degree of rotation of the arm on its pivot 100. Optic and digital sensors can also be employed to generate the requisite voltage signal for supply to the amplifier.

The embodiments of the invention in which an exclusive property or privilege is claimed are defined as follows:

1. A mirror deflecting system comprising:

a mirror;

means mounting the mirror for movement about a mirror axis so that field of view through the mirror can be changed, from that when in a rest position of the mirror, upon its said movement;

a lever arm mounted for movement between a rest position and a deflected position;

means for urging said lever arm into its rest position whenever moved from that position;

operative means connecting said lever arm and said mirror for effecting movement of said mirror about said axis when said lever arm is deflected from said rest position;

means for setting the rest position of said mirror; and means for locking said lever arm in multiple deflected positions out of said rest position of said lever arm.

2. A system as defined in claim 1, wherein said means for urging said lever arm comprises a return spring for urging said mirror into its rest position.

3. A system as defined in claim 1 or 2, wherein the operative means connecting the lever arm and the mirror comprises a Bowden cable link, and an operating arm mounted to said mirror axis, said operating arm being connected to said cable.

4. A system as defined in claim 3, said rest position of said mirror being adjustable by threaded screw sleeve means mounted in said hand grip means for urging a sleeve of the Bowden cable link with respect to a core member of said cable.

5. A system as defined in claim 4, said lever arm forming part of a hand grip means for gripping by an operator and movement of said lever arm.

6. A system as defined in claim 5, said hand grip means being mounted to a gearshift lever of said vehicle.

7. A system as defined in claim 5, said hand grip means being mounted to said vehicle adjacent an operator position in said vehicle.

8. A system as defined in claim 3, said lever arm forming part of a hand grip means for gripping by an operator and movement of said lever arm.

9. A system as defined in claim 8, said hand grip means being mounted to a gearshift lever of said vehicle.

10. A system as defined in claim 8, said hand grip means being mounted to said vehicle adjacent an operator position in said vehicle.

11. A system as defined in claim 1 or 2, said means for locking said lever arm comprising ratchet means on said lever arm, permitting movement of said lever arm when forced from any deflected locked position.

12. A system as defined in claim 11, said ratchet means comprising at least one toothed wheel mounted to said lever arm and spring-loaded means in said hand grip means engaging into teeth of said at least one toothed wheel.

13. A system as defined in claim 12, wherein said spring-loaded means comprises a housing, a plunger in the housing, and spring means between the housing and the plunger urging said plunger into engagement with said teeth.

14. A system as defined in claim 13, further comprising a bistable rod mechanism engaging said housing for placing said housing in a first position where said plunger engages the teeth, and a second position in which said plunger is raised from said teeth.

15. A system as defined in claim 14, further comprising a push push bistable mechanism for said bistable rod mechanism.

16. A system as defined in claim 14, comprising a detent bistable mechanism for said bistable rod mechanism.

17. A system as defined in claim 11, said lever arm forming part of a hand grip means for gripping by an operator and movement of said lever arm.

18. A system as defined in claim 17, said hand grip means being mounted to a gearshift lever of said vehicle.

19. A system as defined in claim 17, said hand grip means being mounted to said vehicle adjacent an operator position in said vehicle.

20. A system as defined in claim 1 or 2, said lever arm forming part of a hand grip means for gripping by an operator and movement of said lever arm.

21. A system as defined in claim 20, said hand grip means being mounted to a gearshift lever of said vehicle.

22. A system as defined in claim 20, said hand grip means being mounted to said vehicle adjacent an operator position in said vehicle.

23. A mirror deflecting system comprising:

a mirror;

means mounting the mirror for movement about a mirror axis so that field of view through the mirror can be changed, from that in a rest position of the mirror, upon its said movement;

a lever arm mounted for movement between a rest position and a deflected position;

means for urging said lever arm into its rest position whenever moved from that position;

operative means connecting said lever arm and said mirror for effecting movement of said mirror about said axis when said lever arm is deflected from said rest position;

means for setting the rest position of said mirror;

wherein the operative means comprises a reversible motor connected to said mirror for moving it about its mirror axis, means sensing the position of said lever arm, means connecting said motor and said means sensing the position of said lever arm for driving said motor in a direction corresponding to direction of movement of said lever arm, second sensing means for sensing position of said mirror about said axis, feed back means to said motor from said second sensing means for terminating operation of said motor when the mirror has been moved to a position corresponding to sensed position of said lever arm; and variable potential adjusting means connected to said second sensing means for setting shaft position of said motor with respect to the position of said lever arm for allowing rest position adjustment of said mirror.

24. A system as defined in claim 23, wherein an operational amplifier is intermediate the means sensing the position of said lever arm and said motor, said feedback means including said operational amplifier.

25. A system as defined in claim 23 or 24, wherein said means sensing the position of said lever arm comprises potentiometer means driven by said lever arm.

26. A system as defined in claim 25, further comprising means for locking said lever arm in multiple deflected positions out of said rest position of said lever arm.

27. A system as defined in claim 23 or 24, said variable potential means being mounted on hand grip means.

28. A system as defined in claim 27, further comprising means for locking said lever arm in multiple deflected positions out of said rest position of said lever arm.

29. A system as defined in claim 23 or 24, said lever arm forming part of a hand grip means for gripping by an operator and movement of said lever arm.

30. A system as defined in claim 29, said hand grip means being mounted to a gearshift lever of said vehicle.

31. A system as defined in claim 29, said hand grip means being mounted to said vehicle adjacent an operator position in said vehicle.

32. A system as defined in claim 23 or 24, further comprising means for locking said lever arm in multiple deflected positions out of said rest position of said lever arm.

33. A system as defined in claim 32, said means for locking said lever arm comprising ratchet means on said lever arm, permitting movement of said lever arm when forced from any deflected locked position.

* * * * *